3,201,433
PREPARATION OF AROMATIC ISOCYANATES FROM CYANIC ACID VAPORS
Milton Manes and Johnstone S. Mackay, Pittsburgh, Pa., assignors, by mesne assignments, to United States Steel Corporation, Pittsburgh, Pa., a corporation of New Jersey
No Drawing. Filed Feb. 26, 1963, Ser. No. 261,211
8 Claims. (Cl. 260—453)

This invention relates to the preparation of aromatic isocyanates.

Aromatic isocyanates are prepared commercially today by converting an aromatic hydrocarbon to a nitro compound, reducing the latter to an amine and converting the amine to the isocyanate. This method is relatively expensive.

It is an object of the present invention to develop a novel procedure for preparing an aromatic isocyanate.

A further object is to develop a procedure of preparing aromatic isocyanates which procedure is economically attractive.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects are attained by reacting a mono- or polyhaloaromatic hydrocarbon with cyanic acid vapor at elevated temperatures, usually 400–550° C. The term cyanic acid vapor is meant to cover the equilibrium mixture of cyanic and isocyanic acid as it exists in the vapor phase. Preferably a copper containing catalyst such as copper, cupric oxide, or cupric halides such as cupric chloride and cupric bromide is also employed. The cyanic acid vapor is normally obtained by vaporizing cyanuric acid although it can also be obtained from other sources such as urea. The halogen atom or atoms of the haloaromatic compound are directly attached to the aromatic ring or rings. The reactants can be used in equivalent amounts or either can be in excess. Preferably, the cyanic vapors are used in excess.

The reaction proceeds according to the equation:

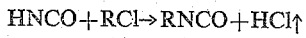

HNCO+RCl→RNCO+HCl↑ where R is an aromatic residue. There should be used at least one mole of the cyanic acid for each chlorine on the aromatic ring when it is desired to insure replacement of all the available chlorine atoms of isocyanate groups.

Examples of suitable aromatic chlorides as starting materials are o-chlorotoluene, p-chlorotoluene, m-chlorotoluene, chlorobenzene, 2,4-dichlorotoluene, 2,6-dichlorotoluene, bis(p-chlorophenyl)methane, 1,5-dichloronaphthalene, 3,3′-dimethoxy-4,4′-dichlorodiphenyl, 3,3′-dimethyl-4,4′-dichlorodiphenyl, 1,4-dichlorobenzene, 1,3-dichlorobenzene, 4,4′-dichlorodiphenyl, 1,2,4-trichlorobenzene, 2,4,6-trichlorotoluene, 4,4′,4″-trichlorotriphenylmethane, 2,4,4′-trichlorodiphenyl ether, p-chloroethylbenzene, o-nitrochlorobenzene, o-methoxy chlorobenzene, and p-ethoxychlorobenzene.

Examples of isocyanates which can be made according to the present invention are phenyl isocyanate, o-tolyl isocyanate, m-tolylisocyanate, 2,4-tolylene diisocyanate, 2,6-tolylene diisocyanate, 2-chloro-4-isocyanato toluene, 4-chloro-2-isocyantato toluene 4,4′-diphenylmethane diisocyanate, 1,5-naphthalene diisocyanate, 3,3′-dimethyl-4,4′-biphenyl diisocyanate, phenylene diisocyanate, 4,4′-biphenyl diisocyanate, chlorophenylene-2,4-diisocyanate, 2,4,6-triisocyanato toluene, 4,4′,4″-triphenylmethane triisocyanate, 2,4,4′-triisocyanato diphenyl ether, o-nitrophenyl isocyanate.

Unless otherwise indicated, all parts and percentages are by weight.

Although not essential, it is frequently desirable to dilute the reactants with in inert gas such as nitrogen, helium, argon or xenon.

Example 1

A mixture of vaporized o-chlorotoluene and vaporized cyanuric acid together with 100 cc./min. of nitrogen to maintain flow were passed over 700 grams of a cataylst containing 30% by weight of cupric chloride on pumice at a reactor temperature of 465° C. The o-chlorotoluene vapors were passed at a rate of 0.2 gram/min. and the vaporized cyanuric acid (cyanic acid vapor) at a rate of 0.3 gram/min. The reaction was run for 3.5 hours. (The catalyst had been calcined at a temperature of 425° C. prior to use.)

The effluent vapors from the reactor were collected in a scrubber with circulating carbon tetrachloride. The molar yield of o-tulene isocyanate per pass was 69%.

Example 2

In an experiment which lasted for 1.5 hours, there were vaporized urea at a rate of 200 grams/hour and 2,4-dichlorotoluene at the rate of 290 grams/hour. This mixture was then heated to 525° C. to maintain flow. There were employed 7 liters of nitrogen/min. The vaporized mixture was passed over copper dioxide as a catalyst. A small amount of toluene diisocyanate was recovered as a product.

Example 3

A mixture of 120 grams/hour urea vapor and 200 grams/hour of o-chloronitrobenzene were passed over cupric oxide and over copper salts impregnated on activated carbon at 525° C. for 1 hour. (The copper salts on activated carbon was prepared by impregnating activated carbon with a mixture of 12 parts ammonia, 8 parts carbon dioxide, 8 parts copper and 72 parts water.) There was recovered a small amount of o-nitrophenylisocyanate.

Example 4

Cyanuric acid was vaporized at a rate of 1 gram/min. and 2,4-dichlorotoluene vaporized at a rate of 2 grams/min. Nitrogen sweep gas was used at a rate of 0.40 liter/min. Pellets of cupric oxide were placed in the reactor and the reactor was maintained at 325° C. for 2.5 hours. There was recovered a small amount of 2,4-tolylene diisocyanate as the product.

Similar results were obtained in another run carried out for 3.5 hours at 540° C. using 0.2 gram/min. of volatilized cyanuric acid; 0.6 gram/min. of volatilized 2,4-dichlorotoluene and 0.54 liter/min. of nitrogen using the same cupric oxide pellets as the catalyst.

Example 5

Small amounts of 2,4-tolylene diisocyanate were recoverd in each of the following runs using 400 grams of pelletized cupric oxide as the catalyst.

| Run No | 1 | 2 | 3 | 4 | 5 | 6 | 7 | 8 | 9 |
|---|---|---|---|---|---|---|---|---|---|
| Duration (hrs.) | 1.5 | 2.67 | 5.5 | 1.33 | 1.17 | 5 | 2.5 | 2.33 | 3.5 |
| Cyanuric acid, gram/min | 0.45 | 0.17 | 0.13 | 0.13 | 0.14 | 0.11 | 0.13 | 0.16 | 0.15 |
| 2,4-dichloro-toluene, gram/min | 0.41 | 0.22 | 0.17 | 0.15 | 0.23 | 0.14 | 0.16 | 0.14 | 0.12 |
| Nitrogen, cc./min | 540 | 1,000 | 1,000 | 1,200 | 1,200 | 160 | 160 | 300 | 300 |
| Reactor temp. (°C.) | 525 | 520 | 525 | 525 | 520 | 520 | 520 | 520 | 520 |
| Solids recovered after caustic wash, gms | (*) | (*) | (*) | (*) | (*) | 0.16 | 0.81 | 0.09 | 0.15 |

*Weight of solids not determined.

Example 6

Cyanuric acid was volatilized and the vapors reacted with chlorobenzene vapors over cupric oxide pellets in the following runs to produce phenyl isocyanate. The phenyl isocyanate was identified by reaction with aniline and determining the melting point of the resulting diphenyl urea and a mixed melting point with known diphenyl urea.

| Run No | 1 | 2 | 3 |
|---|---|---|---|
| Duration (hrs.) | 1.33 | 2 | 3 |
| Cyanuric acid, gram/min | 0.14 | 0.10 | 0.07 |
| Chlorobenzene, gram/min | 0.27 | 0.35 | 0.35 |
| Nitrogen, cc./min | 300 | 300 | 300 |
| Reactor temp., °C | 520 | 525 | 540 |
| Solids after caustic wash, gms | 0.04 | 0.14 | 0.86 |

Example 7

Cyanuric acid was volatilized and the vapors reacted with o-chlorotoluene vapors over cupric oxide pellets in the following runs to produce o-tolyl isocyanate.

| Run No | 1 | 2 | 3 |
|---|---|---|---|
| Duration (hrs.) | 1.25 | 1.33 | 1.5 |
| Cyanuric acid (gram/min.) | 0.65 | 0.55 | 0.75 |
| o-Chlorotoluene (gram/min.) | 0.60 | 0.55 | 0.50 |
| Nitrogen (cc./min.) | 160 | 160 | 160 |
| Reactor temp. (°C.) | 505 | 430 | 450 |
| Solids after NaOH wash | 2.5 | 1.1 | 2 |
| o-Chlorotoluene, converted percent | 39.0 | 54 | 30.0 |
| o-Tolyl isocyanate (molar yield, percent) | 12.8 | 2.25 | 5.0 |

Since 61% of the o-chlorotoluene starting material in run 1 was recovered, the yield of o-tolyl isocyanate based on the o-chlorotoluene reacted was 33%.

Example 8

600 grams of pea-size pumice was soaked in a solution of 180 grams of cupric chloride in 1000 cc. of water. After standing overnight, the soaked pumice was transferred to a flask and heated to dryness at 360° C. for 8 hours. The catalyst, 700 grams, was charged to the reactor and calcined at 425° C. under a nitrogen atmosphere over the weekend. This catalyst was used not only in this Example 8 but also was the catalyst in previous Example 1.

The results of the formation of isocyanate are summarized below.

| Run No | 1 | 2 | 3 | 4 | 5 | 6 | 7 | 8 | 9 | 10 | 11 |
|---|---|---|---|---|---|---|---|---|---|---|---|
| Duration (hrs.) | 3 | 1.25 | 2.5 | 2 | 2 | 2 | 1 | 1 | 0.75 | 1 | 2 |
| Cyanuric acid (gram/min.) | 0.5 | 0.4 | 0.1 | 0.35 | 0.5 | 0.4 | 0.5 | 0.4 | 0.65 | 0.4 | 0.4 |
| Chlorobenzene (gram/min.) | 0.35 | 0.6 | 0.25 | | | | | | | | |
| 2,4-dichlorotoluene (gram/min.) | | | | 0.35 | 0.4 | 0.4 | | | | | |
| o-Chlorotoluene (gram/min.) | | | | | | | 0.36 | 0.45 | 0.2 | 0.2 | 0.27 |
| Nitrogen (cc./min.) | 160 | 160 | 140 | 160 | 160 | 160 | 160 | 160 | 100 | 100 | 100 |
| Reactor temp., °C | 440 | 440 | 440 | 435 | 480 | 460 | 480 | 500 | 465 | 465 | 465 |
| Solids after NaOH wash | 0.7 | 0.3 | 0.4 | 1.0 | 6.8 | 2.4 | 0.3 | 0.3 | (*) | 1.1 | (*) |
| Chlorobenzene recovery, percent | 75.0 | 77.5 | 85.0 | | | | | | | | |
| 2,4-dichlorotoluene recovery, percent | | | | 83.6 | 44.5 | 72.5 | | | | | |
| o-Chlorotoluene recovery, percent | | | | | | | (*) | 33.0 | 41.0 | 63.0 | 83.5 |
| Phenyl isocyanate (molar yield, percent) | 4.4 | 4.2 | 5.1 | | | | | | | | |
| 2,4-tolylene diisocyanate (molar yield, percent) | | | | (*) | 1.0 | (*) | | | | | |
| o-Tolylisocyanate (molar yield, percent) | | | | | | | 22.3 | 1.6 | 29.0 | 3.9 | 10.8 |

*Indicates numerical value not determined.

In runs 4, 5 and 6 in addition to the 2,4-tolylene diisocyanate three was also obtained a mixture of isomeric chlorotolyene monoisocyanates.

Since the unreacted chlorocarbocyclic compounds can be recycled to subsequent runs, the ultimate yields obtained are considerably higher than the values set forth above. Thus, in run 3 the ultimate yield is 34% and in run 1 the ultimate yield is 65%.

Example 9

Using the same cupric chloride on pumice catalyst as in Example 8 but in an amount of 1050 grams, the following results were obtained.

| Run No | 1 | 2 | 3 | 4 | 5 | 6 | 7 | 8 |
|---|---|---|---|---|---|---|---|---|
| Duration (hrs.) | 4.5 | 3.5 | 4.5 | 6 | 4.5 | 5.5 | 6 | 5 |
| Cyanuric acid (gram/min.) | 0.11 | 0.28 | 0.15 | 0.16 | 0.21 | 0.18 | 0.25 | 0.22 |
| o-Chlorotoluene (gram/min.) | 0.26 | 0.26 | | | | | | |
| 2,4-dichlorotoluene (gram/min.) | | | 0.19 | 0.17 | 0.26 | 0.24 | 0.25 | 0.25 |
| Nitrogen (cc./min.) | 100 | 100 | 80 | 80 | 80 | 80 | 80 | 100 |
| Reactor temp., °C | 465 | 465 | 465 | 465 | 465 | 465 | 480 | 435 |
| Tolyl isocyanate (molar yield, percent) | 2.4 | 5.3 | | | | | | |
| o-Chlorotoluene recovery, percent | 55.0 | 57.0 | | | | | | |
| 2,4-dichlorotoluene recovery, percent | | | 29.5 | 47.0 | 32.0 | 44.0 | 28.0 | 37.0 |
| 2,4-tolylene diisocyanate (molar yield, percent) | | | (¹) | (¹) | (¹) | (¹) | 0.1 | (¹) |
| Isocyanate as phenyl isocyanate (molar yield, percent) | | | (²) | (²) | (²) | 2.06 | 6.43 | 2.93 |

¹ Indicates the value was not determined.
² Trace.

In Example 9 runs 3, 4, 5, 6, 7 and 8, the isocyanate calculated as phenyl isocyanate was a mixture of chlorotolylene diisocyanates, specifically a mixture of 2-chloro-4-isocyanato toluene and 4-chloro-2-isocyanato toluene.

*Example 10*

In addition to preparing isocyanates from aryl chlorides, it has been found possible to form isocyanates by reacting aromatic hydrocarbons, e.g., of the benzene series, with cyanic acid vapors. Thus, using 700 grams of the cupric chloride on pumice catalyst of Example 8, there were conducted the following runs:

| Run No. | 1 | 2 | 3 |
|---|---|---|---|
| Duration (hrs.) | 1.5 | 1 | 2.5 |
| Cyanuric acid (gram/min.) | 0.5 | 0.5 | 0.35 |
| Mesitylene (gram/min.) | 0.35 | 0.55 | 0.2 |
| Nitrogen (cc./min.) | 160 | 100 | 160 |
| Reactor Temp., °C | 450 | 425 | 480 |
| Mesitylene recovery, percent | 55.0 | 42.0 | 52.5 |
| Isocyanate (molar yield, percent) | 1.0 | Trace | 1.0 |

This example, to the best of applicants' knowledge, is the first time an organic isocyanate has been made by direct reaction of a hydrocarbon.

What is claimed is:

1. A process of preparing an aromatic isocyanate comprising heating cyanic acid vapors at a temperature between 400 and 550° C. with vapors of a member of the group consisting of mesitylene, o-chlorotoluene, p-chlorotoluene, m-chlorotoluene, chlorobenzene, 2,4-dichlorotoluene, 2,6-dichlorotoluene, bis(p-chlorophenyl)methane, 1,5-dichloronaphthalene, 3,3'-dimethoxy-4,4'-dichlorodiphenyl, 3,3'-dimethyl-4,4'-dichlorodiphenyl, 1,4-dichlorobenzene, 1,3 - dichlorobenzene, 4,4' - dichlorodiphenyl, 1,2,4-trichlorobenzene, 2,4,6-trichlorotoluene, 4,4',4''-trichlorotriphenylmethane, 2,4,4' - trichlorodiphenyl ether, p-chloroethylbenzene, o-nitrochlorobenzene, o-methoxychlorobenzene, and p-ethoxychlorobenzene.

2. A process according to claim 1 which is carried out in the presence of a catalyst selected from the group consisting of copper, cupric oxide, cupric chloride and cupric bromide.

3. A process according to claim 1 in which the member of the group is monochlorotoluene.

4. A process according to claim 1 wherein the member of the group is 2,4-dichlorotoluene.

5. A process according to claim 1 wherein the member of the group is 2,6-dichlorotoluene.

6. A process according to claim 1 wherein the member of the group is mesitylene.

7. A process of preparing toluene diisocyanate comprising heating cyanic acid vapors at a temperature between 400 and 550° C. with vapors of dichlorotoluene in which both chlorine atoms are attached to ring carbon atoms.

8. A process according to claim 7 which is carried out in the presence of a catalyst selected from the group consisting of copper, cupric oxide, cupric chloride and cupric bromide.

References Cited by the Examiner

UNITED STATES PATENTS

| 2,866,802 | 12/58 | Graham | 260—453 |
| 2,866,803 | 12/58 | De Pree | 260—453 |
| 2,883,388 | 4/59 | England. | |

CHARLES B. PARKER, *Primary Examiner.*